United States Patent [19]
Burch

[11] Patent Number: 6,135,642
[45] Date of Patent: Oct. 24, 2000

[54] NUT WITH COAXIAL BEARING

[76] Inventor: Rusty E. Burch, 7171 Kimball Ct., Hesperia, Calif. 92345

[21] Appl. No.: 09/313,630

[22] Filed: May 18, 1999

[51] Int. Cl.[7] ..................................................... F16C 19/06
[52] U.S. Cl. ........................................... 384/540; 411/427
[58] Field of Search .............................. 411/427; 384/540, 384/537, 513, 584

[56] References Cited

U.S. PATENT DOCUMENTS

| | | | |
|---|---|---|---|
| 4,811,976 | 3/1989 | Yagisawa | 411/427 |
| 5,871,322 | 2/1999 | Nakamura | 411/427 |

Primary Examiner—Lenard A. Footland
Attorney, Agent, or Firm—Edgar W. Averill, Jr.

[57] ABSTRACT

A nut with a coaxial bearing or dynamically brace-supporting independently-rotating, coaxial first and second cylindrical surfaces to each other. The nut has a fastener portion having a conventional nut configuration, and a bearing portion having a conventional bearing configuration. The fastener portion threadedly mounts to the threaded end of the independently-rotating, coaxial first cylindrical surface. The bearing portion is affixed to the fastener portion along an annular outer race, and supports an independently-rotating, coaxial second cylindrical surface along an annular inner race.

5 Claims, 3 Drawing Sheets

NUT WITH COAXIAL BEARING

BACKGROUND OF THE INVENTION

The field of the invention generally pertains to fasteners. The invention relates more particularly to a nut with a coaxial bearing for dynamically brace-supporting a pair of coaxial cylindrical surfaces rotating independently of the other. A typical application of the nut is to dynamically brace-support a main drive gear to a coaxial mainshaft of a Harley-Davidson motorcycle transmission.

Nuts are commonly used to secure a bolt or similarly threaded shank to an attaching piece. In one particular application, a nut is used in Harley-Davidson motorcycle transmissions to secure a final-drive transmission pulley or sprocket (belt or chain drive, respectively) to a main drive gear with a threaded end partially protruding out from inside the transmission case. The main drive gear has a cylindrically hollow center permitting a mainshaft to coaxially extend therethrough and into the transmission case. When in operation, the mainshaft functions to transfer power into the transmission, while the main drive gear functions to transfer power to the rear wheel via the final-drive transmission pulley or sprocket.

One common problem with earlier model Harley-Davidson motorcycles, however, is transmission oil leakage through the main drive gear at the final drive transmission pulley or sprocket. The leakage is caused by wear of the main drive gear bushing and seal located inside the cylindrically hollow center of the main drive gear. Wear on the main drive gear bushing and seal occurs when the mainshaft and/or the main drive gear experiences axial deviation relative to the other during operation, i.e. the main drive gear and/or mainshaft deviates from their common central axis of rotation. This typically occurs due to lack of support of the main drive gear and/or mainshaft in the transmission. The resulting leakage can be messy and frustrating to clean up, and can detract from the enjoyment of riding and owning a Harley-Davidson motorcycle.

One type of nut currently in use incorporates a seal on an abutment surface of the nut in an attempt to remedy the transmission oil leakage problem for Harley-Davidson motorcycles. The nut is threadedly mounted on the main drive gear following the mounting of a final-drive transmission pulley or sprocket on the main drive gear. The nut abuts against the final-drive transmission pulley or sprocket along the seal and secures it to the main drive gear. This prior art nut, however, does not address or correct the source of the problem, i.e. wear in the main drive gear bushing and seal caused by deviation of the main drive gear and/or mainshaft from its true axis of rotation. Oil still seeps through the bushing and seal and out of the transmission case because the main drive gear remains unsupported.

BRIEF SUMMARY OF THE INVENTION

It is an object of the present invention to provide a nut for dynamically brace-supporting a pair of coaxial cylindrical surfaces rotating independent of the other.

It is a further object of the present invention to provide a nut for dynamically brace-supporting a main drive gear to a coaxial mainshaft and thereby prevent transmission oil leakage often seen with older model Harley-Davidson motorcycle transmissions.

The present invention is for a nut having a fastener portion and a bearing portion coaxial with the fastener portion for dynamically brace-supporting first and second coaxial cylindrical surfaces rotating at different speeds and/or directions relative to the other. The fastener portion has a conventional nut configuration, preferably a hexnut, and threadedly mounts to the threaded end of the first coaxial cylindrical surface. The bearing portion has a conventional bearing configuration with the annular outer race affixed to the fastener portion, and the annular inner race snugly supporting the second coaxial cylindrical surface extending through it. In a preferred application, the nut brace-supports a main drive gear to a coaxial mainshaft of a Harley-Davidson motorcycle transmission. The fastener portion threadedly mounts to a threaded end of a main drive gear having a cylindrically hollow center, and secures a final-drive transmission pulley or sprocket to the main drive gear. The bearing portion snugly supports the mainshaft extending through the cylindrically hollow center of the main drive gear, and thereby brace-supports the main drive gear to the mainshaft during its operation.

DETAILED DESCRIPTION OF THE PREFERRED EMBODIMENTS

Figure 1:
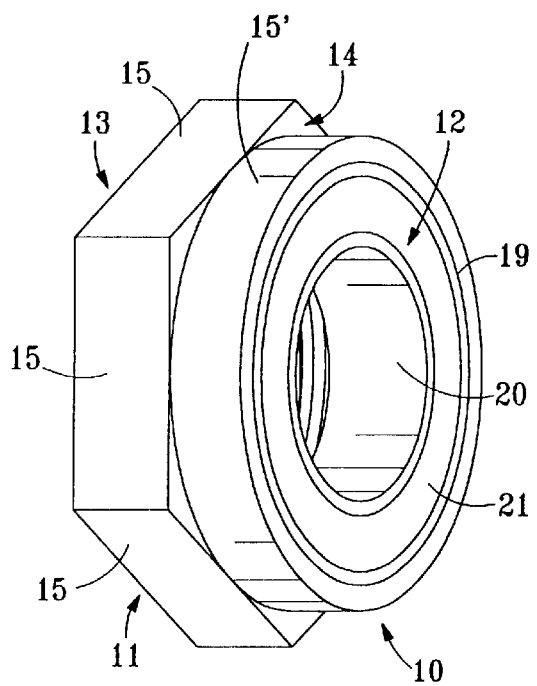
FIG. 1 is a perspective view of the nut of the present invention with a coaxial bearing, viewed from a bearing side.
Figure 2:
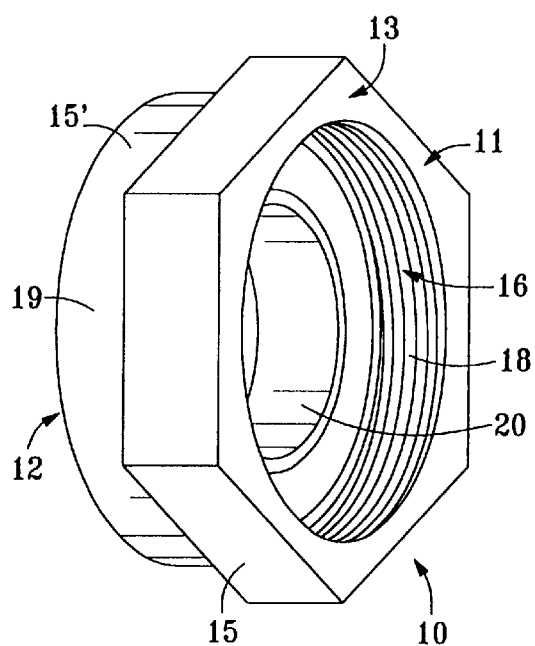
FIG. 2 is a perspective view of the nut of FIG. 1, viewed from a fastener side.

Referring now to the drawings, FIGS. 1–4 show the nut with coaxial bearing, generally indicated at 10 having two main portions: a fastener portion, generally indicated at 11, and a bearing portion, generally indicated at 12. The nut 10 preferably has a steel construction, but is not limited to such. Generally, the fastener portion 11 threadedly secures to a first cylindrical surface 8 (see FIG. 5) having an externally threaded end 8', and the bearing portion 12 snugly and telescopically contacts a second cylindrical surface 9 capable of rotating at a different speed and/or direction relative to the first cylindrical surface 8.

The fastener portion 11 generally has a conventional nut configuration with a first end 13, a second end 14, a multi-faceted exterior surface 15, and a cylindrically shaped cavity 16 having a central axis of rotation 17 (see FIG. 4), a threaded inner surface 18, and a radius $R_3$. Preferably the fastener portion 11 has a conventional "hexnut" configuration wherein the multi-faceted exterior surface 15 has six equal sides. Further, the fastener portion 11 preferably has an annular collar 15' integrally formed on the second end 14 of the fastener portion 11 for surrounding and supporting the bearing portion 12. The threaded inner surface 18 of the cylindrically shaped cavity 16 threadedly mounts to the externally threaded end 8' (FIG. 5) of the first cylindrical surface 8 through the first end 13 of the fastener portion 11.

Figure 3:
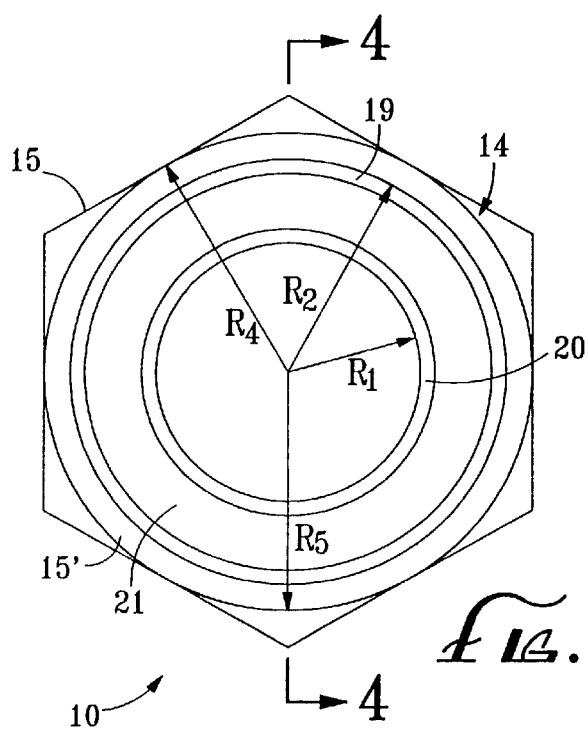
FIG. 3 is a front view of the nut of FIG. 1, showing the coaxial bearing side.
Figure 4:
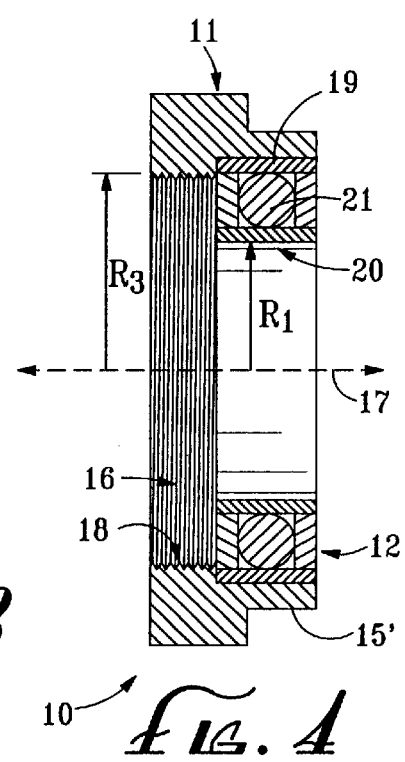
FIG. 4 is a partly cross-sectional side view of the nut of FIG. 1 taken along the line 4—4 of FIG. 3.

The bearing portion 12 generally has a conventional bearing configuration comprising an annular outer race 19, and an annular inner race 20 coaxial with the annular outer race 19 along the central axis of rotation 17. As shown in FIGS. 3 and 4, the annular inner race 20 has a radius $R_1$ less than a radius $R_2$ of the annular outer race 19 and less than the radius $R_3$ of the cylindrically shaped cavity 16 of the fastener portion 11. The annular inner race 20 is connected to the annular outer race 19 by conventional bearing means 21 (see FIGS. 4 and 5), such as ball 21 or roller bearings. The annular outer race 19 secures the bearing portion 12 to the fastener portion 11 at the second end 14 of the fastener portion 11. Because the radius $R_2$ of the annular outer race 19 is less than a radius $R_5$ of the annular collar 15', the annular outer race 19 sits within the annular collar 15' and is preferably affixed to the annular collar 15' as well. And preferably, as shown in FIG. 3, the radius $R_5$ of the annular collar 15' is less than the shortest radial distance $R_4$ of the multi-faceted exterior surface 15. This allows a tool such as a wrench, to fully contact the multi-faceted exterior surface 15 without obstruction when installing or removing the nut 10.

Figure 5:
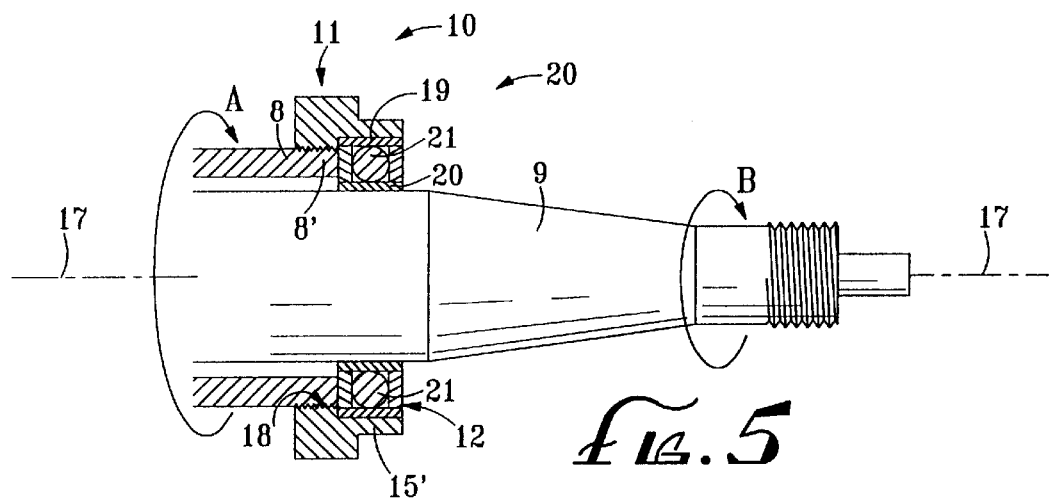
FIG. 5 is a dynamic, partly cross-sectional side view of the nut of FIG. 1 affixed to and dynamically brace-supporting a pair of coaxial cylindrical surfaces rotating at different speeds and/or directions relative to the other.

The dynamic brace-supporting function of the nut 10 can be best seen in FIG. 5 showing a dynamic, partly cross-sectional side view of the nut 10 affixed to the first and second cylindrical surfaces 8, 9. The first and second cylindrical surface 8, 9 have independent rotations A and B, respectively, capable of different rotational rates and/or directions relative to the other. Thus the affixed fastener portion 11 and the affixed annular outer race 19 also rotate with the rotation A of the first cylindrical surface 8, and the annular inner race 20 rotates with the rotation B of the second cylindrical surface 9. Consequently, the first and second cylindrical surfaces 8, 9 are mutually supported by each other during rotational movement and are prevented from deviating from their common central axis of rotation 17.

Figure 6:
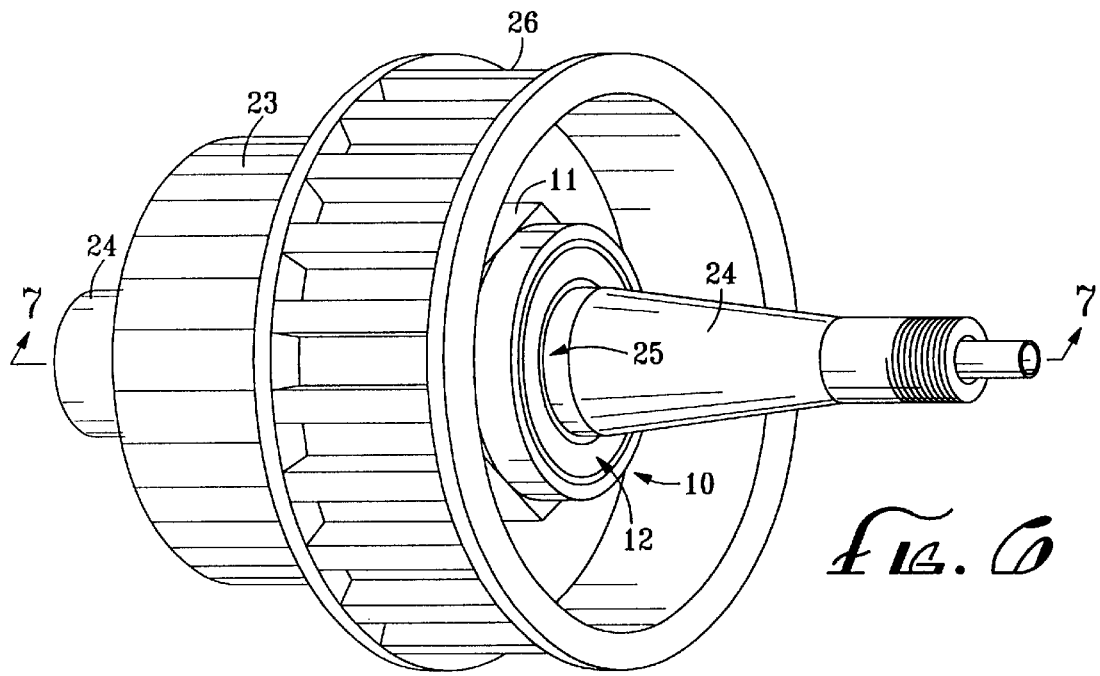
FIG. 6 is a perspective view of the nut of FIG. 1 fully assembled on a Harley-Davidson motorcycle transmission.
Figure 7:
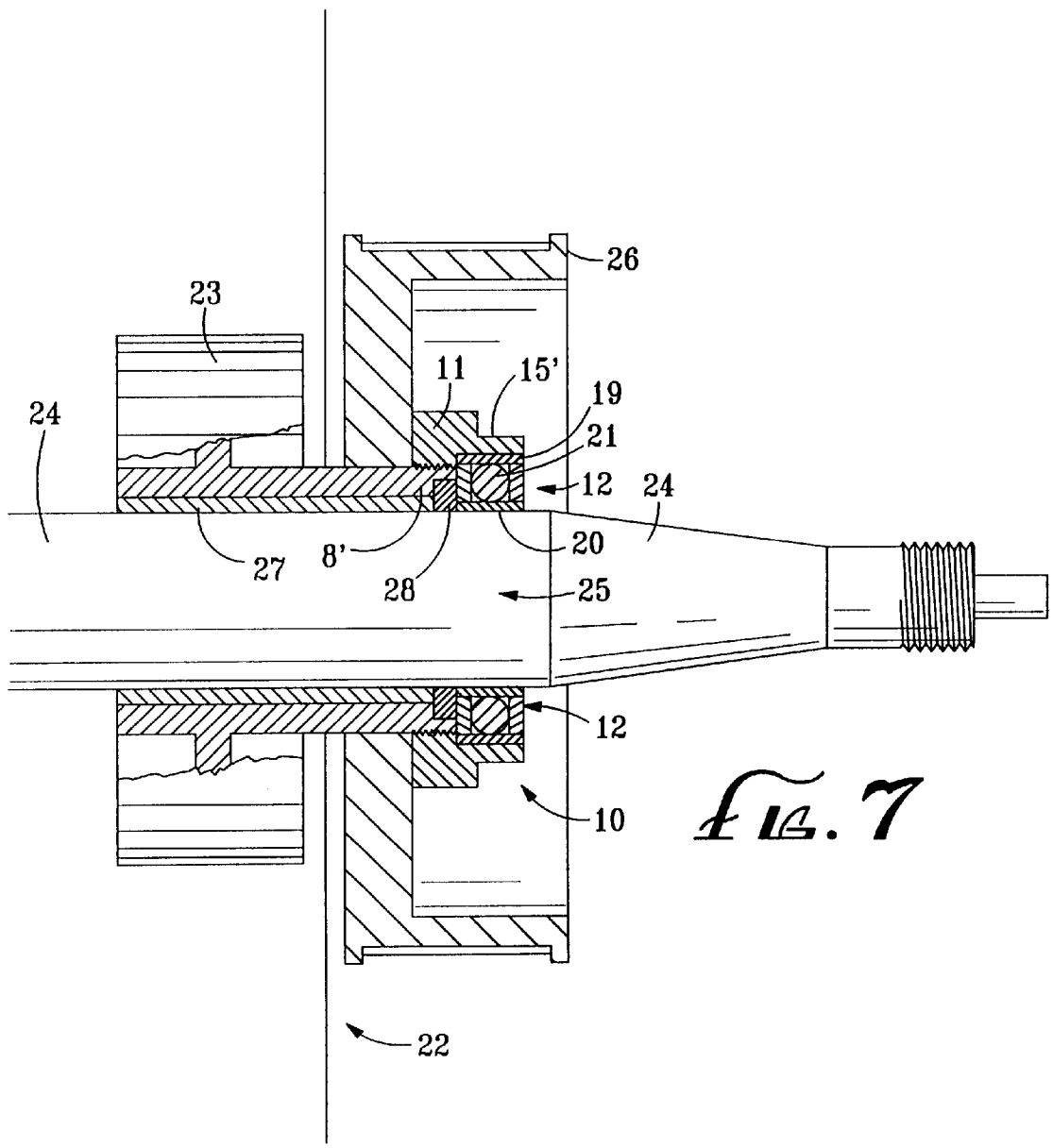
FIG. 7 is a partly cross-sectional side view of the nut of FIG. 1 affixed as shown in FIG. 6.

In a preferred application, the nut 10 brace-supports a main drive gear 23 to an independently-rotating, coaxial mainshaft 24 of a Harley-Davidson motorcycle transmission, generally indicated at 22 (see FIG. 7). FIGS. 6 and 7 show the fastener portion 11 threadedly mounted to a threaded end 8' of the main drive gear 23 having a cylindrically hollow center 25. A main drive gear bushing 27 is positioned inside the cylindrically hollow center 25, with the mainshaft 24 slidably extending therethrough. The fastener portion 11 functions to secure a final-drive transmission pulley or sprocket 26 to the main drive gear 23. The annular inner race 20 of the bearing portion 12 snugly contacts and supports the mainshaft 24 slidably extending through the bushing 27 and thereby brace-supports the main drive gear 23 to the mainshaft 24. In this manner, the mainshaft 24 maintains alignment with the main drive gear 23 along the common central axis of rotation 17, and wear on the bushing 27 is prevented.

On some models, an additional rubber seal 28 is placed within the cylindrically hollow center 25 of the main drive gear 23 at the externally threaded end adjacent the bushing 27 to reduce transmission oil leakage. Without the use of the nut 10, the rubber seal 28 experiences wear similar to the bushing 27 and leakage occurs. However, due to the centering and stabilizing effect of the nut with coaxial bearing 10 as discussed above, this same rubber seal 28 prevents leaking for a far longer period. Thus, when the nut 10 of the present invention is used it is most beneficial when installed during a transmission overhaul while also installing a new bushing 27 and seal 28.

The dynamic brace-supporting function of the nut 10 is particularly useful for use with Harley-Davidson motorcycle transmissions made between 1936 and 1964 inclusive. These transmissions do not provide a means for stabilizing the mainshaft 24 relative to the main drive gear 23. Thus axial deviations of the main drive gear 23 and/or the mainshaft 24 directly translates to friction and wear of the bushing 27 and seal 28. The nut 10 functions to stabilize and support the mainshaft 24 to the main drive gear 23, and to keep them centered on the common central axis of rotation 17.

For Harley-Davidson motorcycle transmissions made between 1970 and 1985 inclusive, an inner primary cover having a bearing is used to pivotally support the mainshaft 24 at one end. Even with this improvement, however, the main drive gear 23 is not prevented from deviating from the common central axis of rotation 17 established by the mainshaft 24. For these transmissions, the nut 10 functions to dynamically brace-support the main drive gear 23 to the stabilized mainshaft 24, and thus maintains coaxial alignment of the two on the common central axis of rotation 17.

"Independent rotation," as used herein, is limited in scope to define the relative rotational degrees of freedom between two coaxial cylindrical surfaces 8, 9 viewed at their contact surfaces. Independent rotation is possible by the conventional bearing means 21 positioned between the two coaxial cylindrical surfaces 8, 9. Independent rotation does not preclude the indirect connection and dynamic dependency of one rotational surface to the other via a series of gears or linkages, such as seen in transmissions.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A nut for dynamically brace-supporting a first cylindrical surface having a threaded end to an independently-rotating, coaxial second cylindrical surface, said nut comprising:

a fastener portion having a first end, a second end, a multi-faceted exterior surface, and a cylindrically-shaped cavity with a central axis of rotation and a threaded inner surface for threadedly mounting to an externally threaded end of a first cylindrical surface at the first end; and a bearing portion with an annular outer race coaxially aligned with and integrally affixed to said fastener portion at the second end, and an annular inner race having a radius less than radii of the annular outer race and the cylindrically-shaped cavity of the fastener portion and coaxially aligned with and rotatably secured to the annular outer race by conventional bearing means, said annular inner race for snugly supporting an independently-rotating coaxial second cylindrical surface extending therethrough.

2. A nut as in claim 1, wherein the fastener portion has an annular collar integrally formed on said second end, said annular collar having a radius greater than the radius of the annular outer race.

3. A nut as in claim 2, wherein the radius of the annular collar is less than the shortest radial distance of the multi-faceted exterior of the fastener portion.

4. A nut as in claim 2, wherein the annular outer race is supplementarily affixed to the annular collar.

5. A nut as in claim 1, wherein the multi-faceted exterior surface of the fastener portion has six equal faces of a conventional hexnut.

* * * * *